United States Patent [19]

Morehouse

[11] 3,824,572

[45] July 16, 1974

[54] ALIGNABLE DISK PACK

[75] Inventor: James Morehouse, San Jose, Calif.

[73] Assignee: Disk Systems Corporation, Santa Clara, Calif.

[22] Filed: Oct. 19, 1973

[21] Appl. No.: 407,885

[52] U.S. Cl. .......................... 340/174.1 C, 346/137
[51] Int. Cl. .............................................. G11b 5/56
[58] Field of Search ....... 340/174.1 C; 179/100.2 A, 179/100.2 MD; 346/137

[56] References Cited

UNITED STATES PATENTS

| | | | |
|---|---|---|---|
| 3,484,760 | 12/1969 | Perkins et al. | 340/174.1 C |
| 3,703,713 | 11/1972 | Pohm et al. | 340/174.1 C |

*Primary Examiner*—Vincent P. Canney
*Attorney, Agent, or Firm*—Woodcock, Washburn, Kurtz & Mackiewicz

[57] ABSTRACT

A magnetic disk subsystem includes four disk packs alignably mounted in recesses in the periphery of a base plate. A rotary access mechanism is mounted on the base plate in the center of the four disk packs and carries magnetic heads into read/write relationship with the disks of the packs. Mating surfaces in the recesses and on the pack housings provide the capability for accurate alignment between the disks of a pack and the rotary access mechanism. The center of rotation of the disk spindle is offset from the center of rotation of the disk pack housing in each recess. Rotation of the disk pack housing with respect to the base plate changes the alignment between the access mechanism and the tracks of the disk.

4 Claims, 4 Drawing Figures

ALIGNABLE DISK PACK

BACKGROUND OF THE INVENTION

This invention relates to a magnetic disk subsystem with a single rotary access mechanism servicing a plurality of disk packs and more particularly to the alignment of the disk packs with respect to the access mechanism.

A recently developed high capacity magnetic disk subsystem includes four magnetic disk packs mounted in a common base plate with their axes parallel to one another. Each pack includes a number of magnetic disks mounted on a spindle. A rotary access mechanism is positioned in the center of the four disk packs. This rotary access mechanism concurrently rotates arms carrying magnetic heads into read/write relationship with the corresponding tracks on disks of all four packs. Such a system is described in the copending application of Ivan Pejcha, Multiple Pack Magnetic Disk System, Ser. No. 364,950, filed May 29, 1973.

In magnetic disk systems which are presently commercially available each access mechanism services one disk pack. In these subsystems the head is normally adjusted with respect to the pack to obtain alignment between the heads and the tracks on the disks. However, in a disk subsystem of the type described in the aforementioned Pejcha application, it is not possible to adjust the access mechanism because changing the access mechanism to bring it into alignment with the tracks on one pack of disks may bring the heads for another pack out of alignment.

SUMMARY OF THE INVENTION

In accordance with this invention a magnetic disk subsystem has a plurality of disk packs mounted on a base plate in such a manner that the disks of the packs are easily and accurately alignable with the magnetic heads of a rotary access mechanism which services all of the disk packs.

The base plate has semi-circular recesses disposed around the periphery thereof, one recess for each of the disk packs. Accurately machined surfaces in each recess mate with surfaces on the disk pack housing to provide an accurate and repeatable alignment between the disk pack and the base plate. The rotary access mechanism is mounted on the base plate in the center of the disk packs. The center of rotation of the disk spindle is offset with respect to the center of rotation of the pack in its recess. Because of this, rotation of the pack housing in the recess produces an alignment motion of the disks with respect to the heads on the access mechanism. In this manner, convenient alignment of the pack can be obtained.

It is an important object of the present invention to provide a magnetic disk subsystem in which the disk packs can be replaced at the location where the system is in service without requiring expensive tools which are only present at the factory.

It is another object of the present invention to provide a magnetic disk subsystem in which each of a plurality of magnetic disk packs are alignable with respect to a common rotary access mechanism.

It is another object of the present invention to provide a disk subsystem in which the servo track can be recorded while the pack is out of the machine and thereafter placed into the machine with the pack being aligned to obtain proper registration between the heads and the servo tracks.

The foregoing and other objects, features and advantages of the invention will be better understood from the following more detailed description and appended claims.

DESCRIPTION OF A PARTICULAR EMBODIMENT

Figure 1:
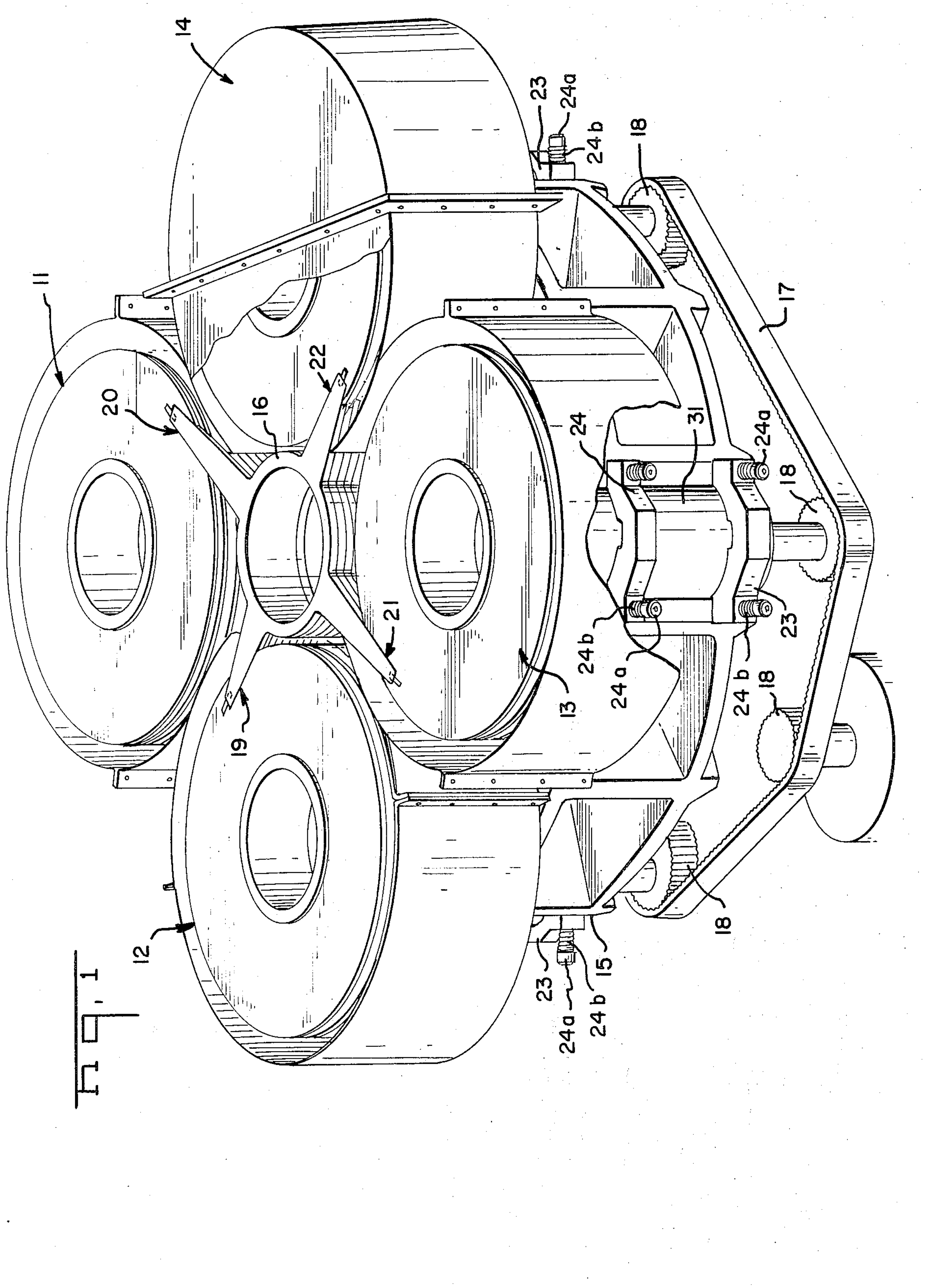
FIG. 1 shows the magnetic disk subsystem of this invention.

The magnetic disk subsystem of this invention includes four magnetic disk packs 11, 12, 13 and 14 mounted with their axes parallel to one another on base plate 15. A rotary access mechanism including positioning rotor 16 concurrently rotates magnetic heads into read/write relationship with the corresponding tracks on disks of all four packs 11–14.

A timing belt 17 interconnects a drive motor 18 with the spindles of the four packs 11–14. The timing belt has teeth that match with timing pulleys 18 and provides a nonslipping drive connection between all four spindles so that the relative angular position does not change.

The positioning rotor 16 carries a plurality of arms including the arms 19, 20, 21 and 22. There is an arm disposed between adjacent pairs of disks in the packs. As the positioning rotor 16 is rotated, magnetic heads carried at the extremity of the arms 19–22 are brought into registration with the tracks of the magnetic disks. It is important that the packs be alignable with the heads carried by the arms. When a disk pack has been removed for servicing, it is particularly important that the alignment be adjustable so that when the head is rotated to a particular position, it will access the same track that had been accessed before the pack was removed.

In this magnetic disk subsystem the bottom disk carries what is commonly referred to as a servo track. This bottom disk has recorded thereon a magnetic pattern which, when played back, will produce a signal indicating the position of all of the magnetic heads carried on the arms of the positioning rotor. Each pack must be aligned so that the position indicated by the servo track signal is the identical track on all four disk packs, accurately and mutually aligned within a small fraction of the track width.

Figure 2:
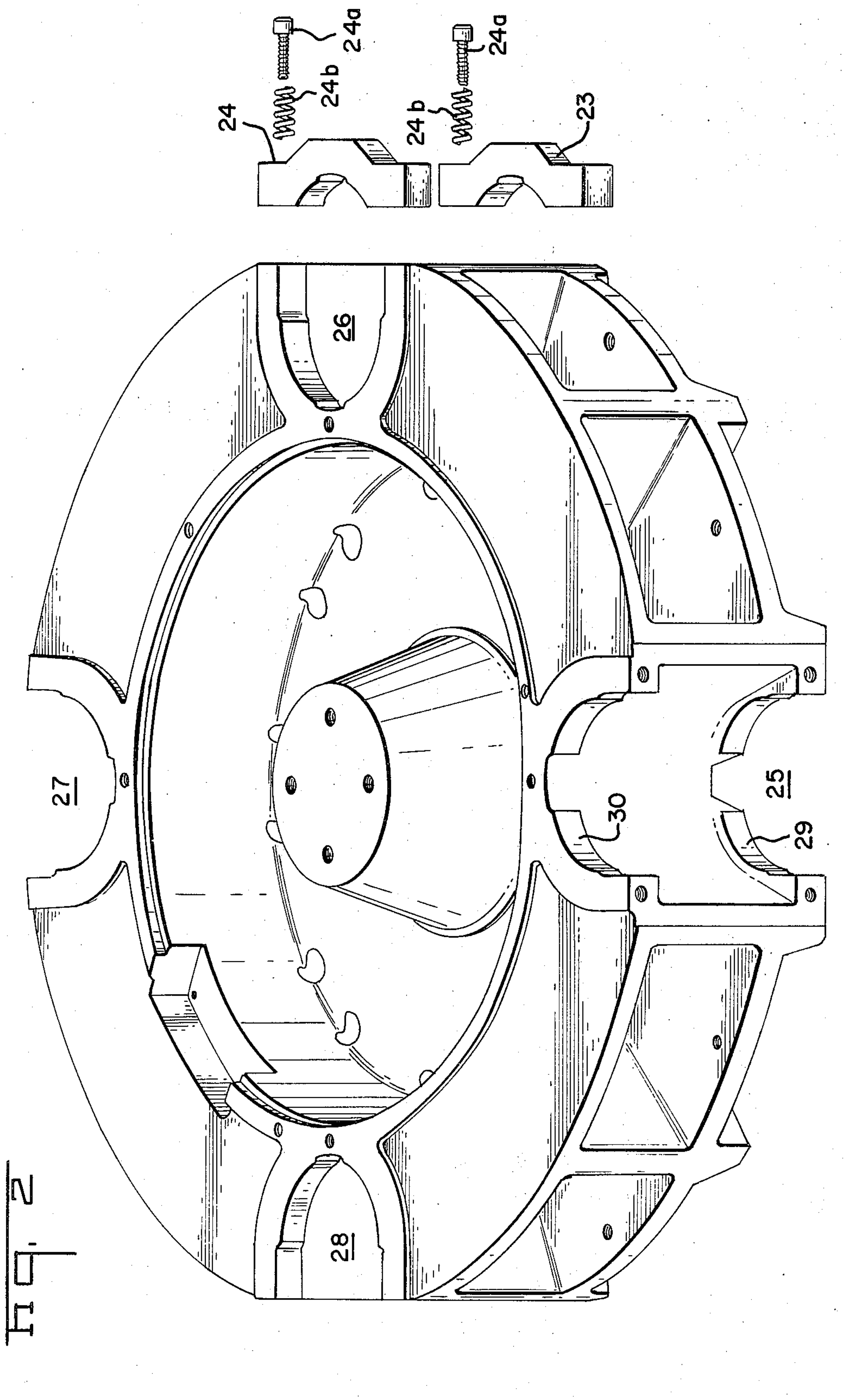
FIG. 2 shows the base plate and clamps.
Figure 3:
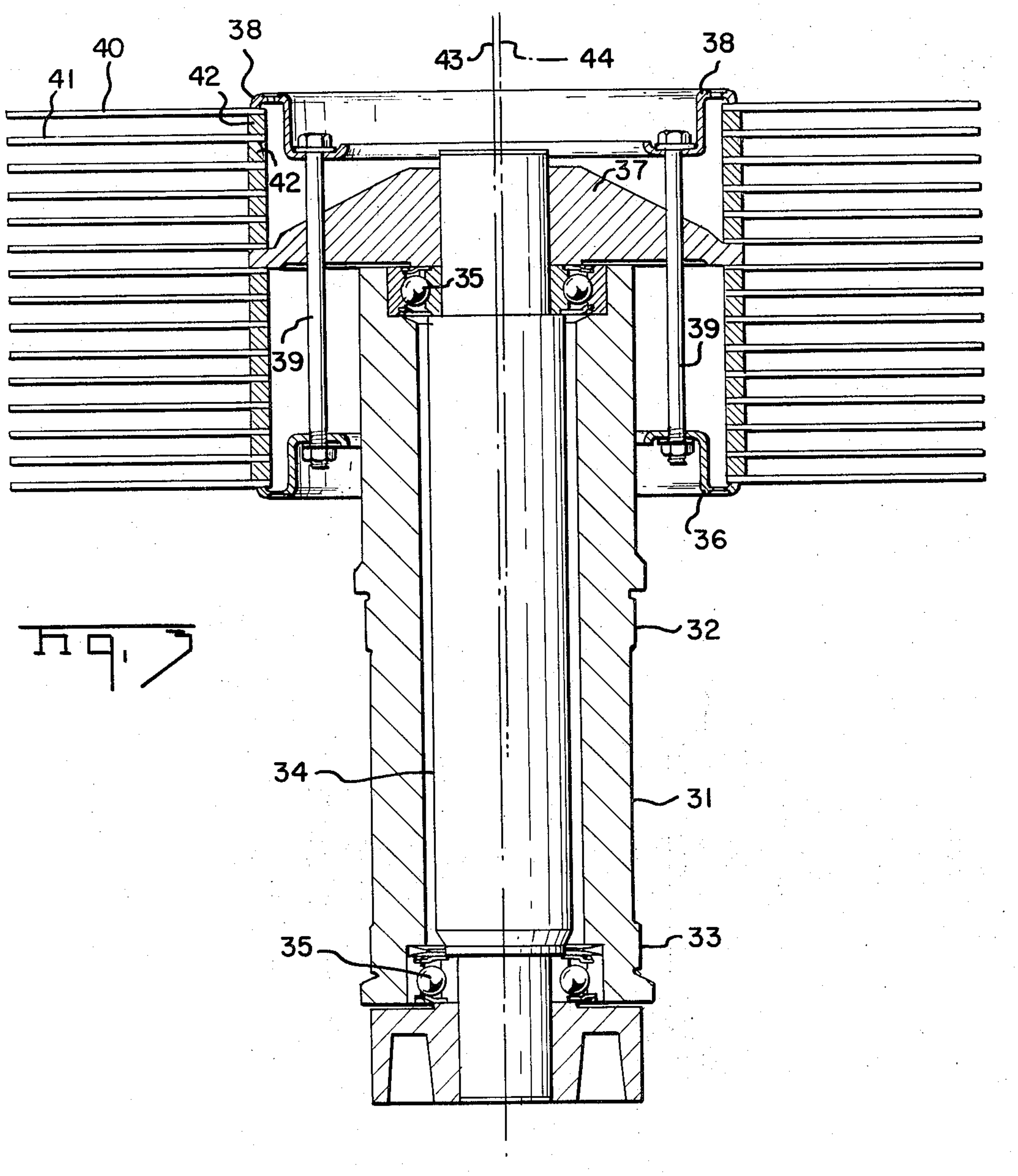
FIG. 3 shows the pack and spindle assembly.

In accordance with this invention each magnetic disk pack is clamped, by clamps 23 and 24, in a recess in the base plate. The base plate is shown in FIG. 2. The clamps are secured to the base plate by bolts **24*a*. Springs 24*b* are under each bolt to provide a high degree of repeatability and accuracy in the clamping force. It includes four recesses 25–28 disposed around the periphery of the base plate. Each of the recesses is generally semicircular and is vertically oriented in the base plate. Alignment surfaces 29 and 30 are provided in the recess 25. As shown in FIG. 3 the pack housing 31 has mating machined surfaces 32 and 33. These mate with the machined surfaces 29 and 30 of the recess and with the inner surface of the clamps 23 and 24.**

The pack spindle 34 is rotatably mounted by ball bearings 35 in the pack housing. A disk base 37 is mounted on the top of the spindle. Two clamps 36 and 38 are mounted by bolts 39 to the disk base. The bolts 39 have a slip fit in the base 37. The disks 40, 41 and others, are separated by conventional spacers 42 and are held in spaced apart relationship by the clamps 36 and 38. The disks rotate with the spindle. The center of rotation of the spindle is indicated by the line 43. The machined surfaces 32 and 33 are such that when the housing 31 is rotated with respect to the base plate, the center of rotation is about the line 44.

The center of rotation of the spindle in the pack is slightly offset from the center of rotation of the pack housing in the recess. In one actual embodiment of the invention the offset is 0.005 inches. The center of rotation of the pack spindle moves in a circle with a radius of the offset (0.005 inches in the example just mentioned) as the housing is rotated with respect to the base plate.

Figure 4:
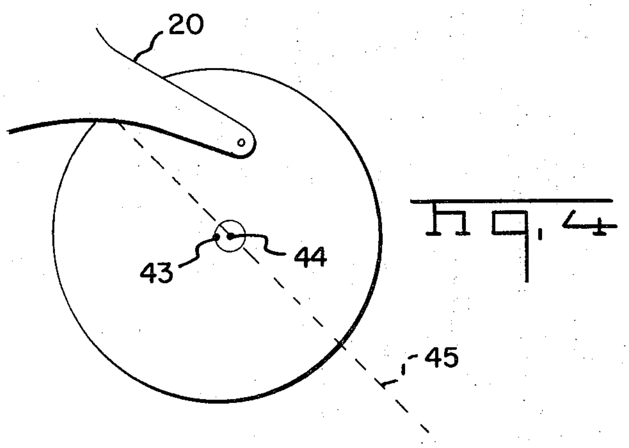
FIG. 4 depicts the alignment of a head with respect to tracks on a disk.

Referring to FIG. 4 the center of rotation 43 of a typical disk is shown with respect to the center of rotation 44 of the pack housing in the recess. As the pack is rotated, the center of rotation 43 of the disk moves in the small circle about the axis 44. This results in a small aligning motion along the radial line 45. The radial line 45 intercepts the center of the rotary access mechanism, having one arm 20 which is shown in FIG. 4. The radial direction of the movement is the important one for alignment and it is the sensitive direction of movement insofar as alignment of the head with respect to the disk is concerned. As the pack is rotated, there is also movement in a tangential direction. However, the system is not critically sensitive to movement in this tangential direction. This makes it possible to obtain radial alignment in this manner.

The two clamps 36 and 38 are on top and on the bottom of the disk pack. These approximately center the disk pack with respect to the base 37. That is, there are approximately as many disks above the base as there are below the base. This reduces the vertical alignment tolerance by approximately one half. In some disk packs, all of the disks are above the base or below the base. Because of this, the tolerances of all of the spacers 42 is cumulative. On the other hand, with the construction shown here, only half of the spacers contribute to the vertical tolerance accumulation. Stated another way, the top disk in the pack has a vertical deviation from nominal measurement from the base 37 which is only half that in prior disk packs. Similarly the bottom disk has approximately the same accumulated vertical tolerance from the base 37.

While a particular embodiment of the invention has been shown and described, various modifications may be made. The appended claims are, therefore, intended to cover all such modifications.

What is claimed is:

1. In a magnetic subsystem of the type including:

a plurality of packs of magnetic disks, each pack of disks being mounted on a spindle, said packs being disposed with the spindles parallel to one another and with the edges of disks in adjoining packs in close proximity one to the other, a single rotary access mechanism mounted for rotation about an axis parallel to, and in the middle of said spindles, said access mechanism including arms carrying magnetic heads into read/write relationship with the tracks of each pack of magnetic disks, the improvement comprising:

a common base plate on which said packs and said rotary access mechanism are mounted, said base plate having a plurality of recesses disposed around the periphery thereof, one recess being provided to mount each of said disk packs, each of said recesses having at least one mounting surface accurately disposed therein, and a mating mounting surface on each of said packs, said packs being rotatable in said recess with the center of rotation of the spindle in the pack being offset with respect to the center of rotation of the pack in its recess to provide alignment of said rotary access mechanism with respect to the magnetic disks on said spindle.

2. The system recited in claim 1 wherein each of said recess is a semi-circular, vertically oriented, recess and wherein said alignment surface includes first and second machined surfaces vertically spaced one from the other and extending around the periphery of said semi-circular recess, and a semi-circular clamp fitting over said disk pack and securing said pack in said semi-circular recess.

3. The system recited in claim 1 wherein each pack includes a pack housing, the pack spindle being rotatably mounted in said housing, a disk base mounted on the top of each spindle, and first and second clamps extending above and below said base and securing said disks in spaced apart relationship one to the other with disks extending above and below said base.

4. The system recited in claim 1 further comprising:

means for clamping each pack in its corresponding recess after alignment.

* * * * *

PO-1050
(5/69)

UNITED STATES PATENT OFFICE
CERTIFICATE OF CORRECTION

Patent No. 3,824,572 Dated July 16, 1974

Inventor(s) JAMES MOREHOUSE

It is certified that error appears in the above-identified patent and that said Letters Patent are hereby corrected as shown below:

Column 4, line 6, "magnetic subsystem" should read --magnetic disk subsystem--.

Signed and sealed this 1st day of October 1974.

(SEAL)
Attest:

McCOY M. GIBSON JR.
Attesting Officer

C. MARSHALL DANN
Commissioner of Patents